May 5, 1964  D. L. PETERS ETAL  3,132,197
WARP FREE INJECTION MOLDING
Filed June 5, 1961  2 Sheets-Sheet 2
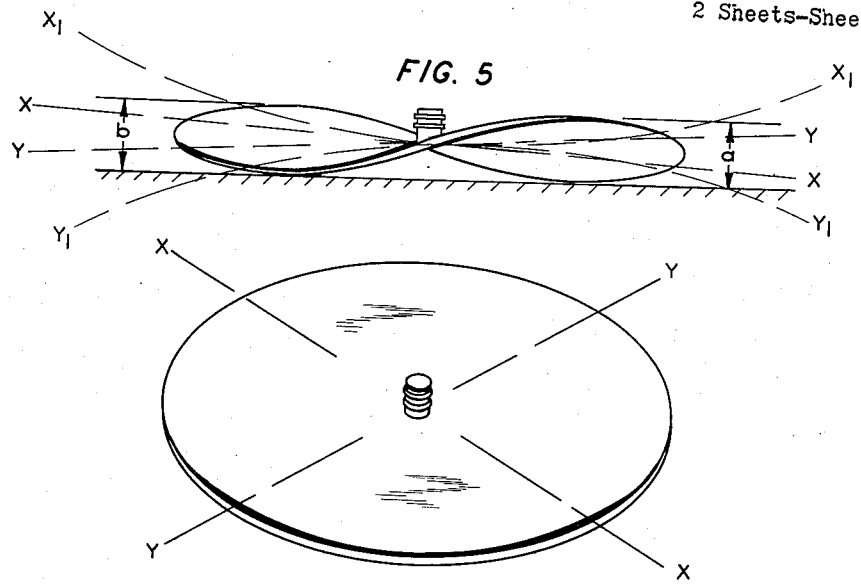
FIG. 5
FIG. 4
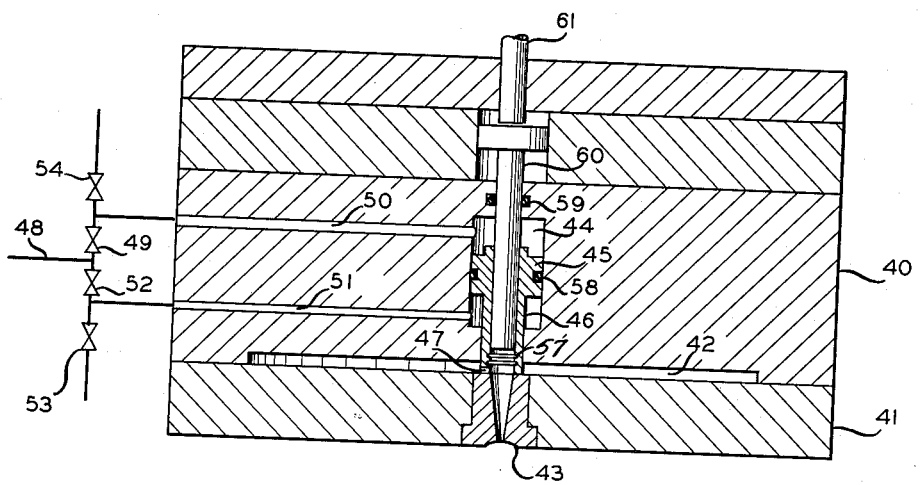
FIG. 2
INVENTORS
D. L. PETERS
MILTON BLAUSTEIN
BY
ATTORNEYS

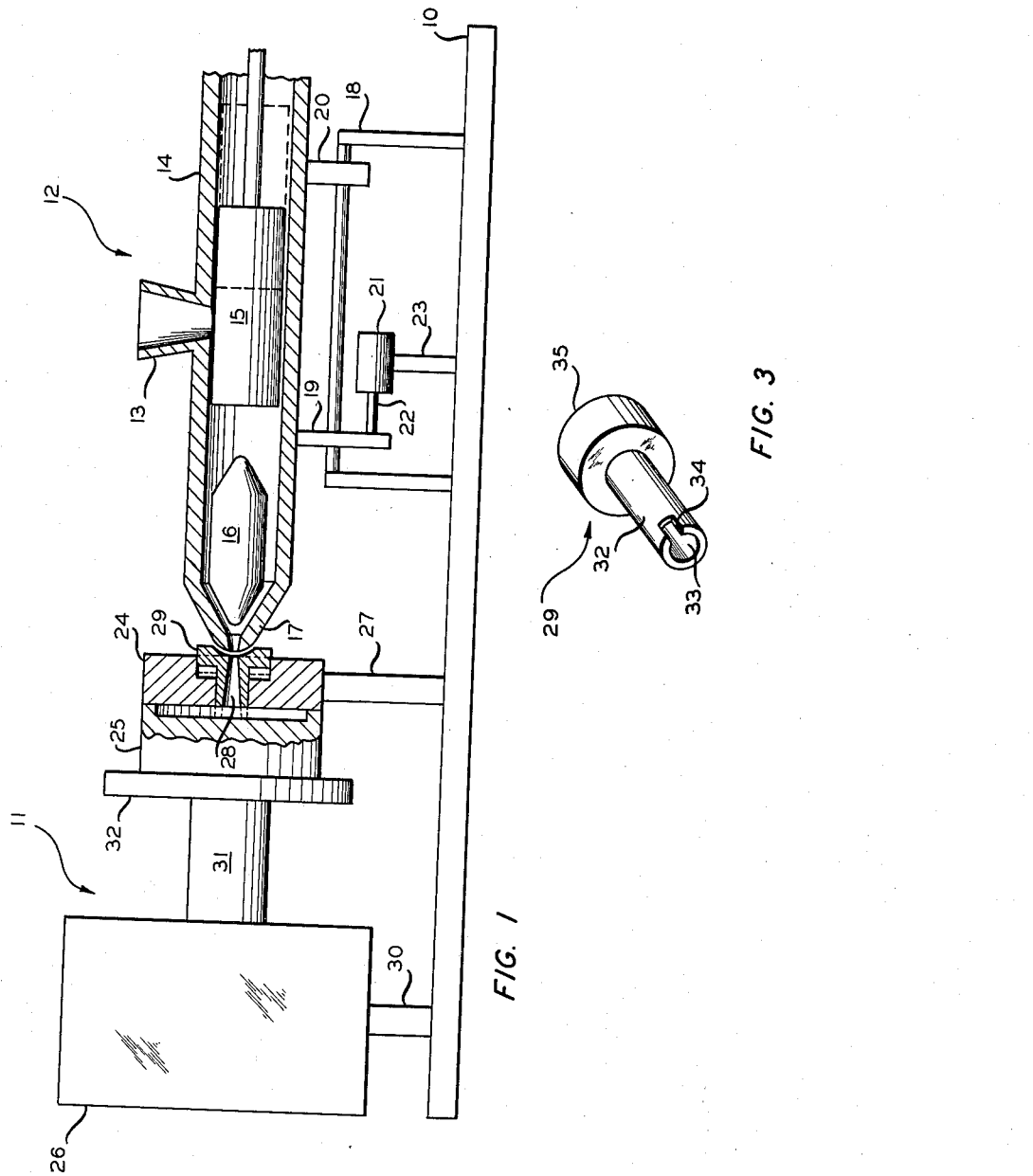

United States Patent Office 3,132,197
Patented May 5, 1964

3,132,197
WARP FREE INJECTION MOLDING
Donald L. Peters and Milton Blaustein, Bartlesville, Okla., assignors to Phillips Petroleum Company, a corporation of Delaware
Filed June 5, 1961, Ser. No. 114,726
12 Claims. (Cl. 264—328)

This invention relates to injection molding of plastic material. In one aspect, the invention relates to reducing warpage in injection molded articles by first filling peripheral portions of a mold and subsequently filling the central portion of the mold. In another aspect, this invention relates to a method for injection molding which includes creating a gating zone within a molding zone, injecting moldable material in one direction from the gating zone into the molding zone to cause filling of the molding zone from the peripheral portion thereof inward toward the central portion thereof and subsequently filling the central portion. In another aspect, this invention relates to injection molding apparatus including an injection mold, molding material injection means, and gating means which can be moved into and out of a central portion of the mold to direct the molding material laterally into the mold at an angle less than 180° to fill the peripheral portions of the mold first and subsequently can be withdrawn to permit filling the central portion of the mold.

Injection molding is widely used in forming articles from plastic molding material. However, at times, difficulty is encountered due to warping of the molded article after it is removed from the mold. This is particularly true when the article has large area relatively thin portions. For example, such warping is particularly prevalent in molding containers having large, flat bottoms or sides.

An object of this invention is to reduce warping of articles molded from plastic materials.

Another object of this invention is to provide an improved injection molding process for producing warp free, large area, flat, molded articles.

Another object of this invention is to provide improved injection molding apparatus for producing warp free molded articles.

Other aspects, objects and the several advantages of this invention are apparent from a study of the specification, the drawing and the appended claims.

According to our invention, there is provided improved injection molding apparatus, including an injection mold, molding material injection means, and means to direct the incoming molding material in one direction within said mold toward the peripheral portions of the mold so that the mold fills from the outside in and which gating means can be withdrawn to permit filling the central portion of the mold. Preferably, the material is injected in an angle between about 5 and about 25°. We have found that the gating means can be projected into the mold by means of pressure acting upon a piston attached to the gating means and the gating means can be withdrawn through the action of the pressure within the mold upon the means itself overcoming the pressure on the piston at a predetermined molding pressure. Further, we have found the gating means can be withdrawn by applying pressure to the opposite side of the piston at a predetermined point in the time cycle of the molding operation.

Further, according to our invention, the retractable gating means comprises a movable sprue bushing having a side outlet gating means formed in the end thereof. The injection apparatus can be withdrawn simultaneously with the sprue bushing.

Further, according to our invention, there is provided an improved injection molding method which comprises directing injection molding material laterally in a molding zone through an angle less than 180° to fill peripheral portions of the zone and subsequently filling the central portion of the zone. The material is directed laterally by blocking the central portion of the molding zone and creating a lateral gating zone therein, and the central portion of the zone is permitted to be filled by a subsequent unblocking of the central zone.

Our invention is particularly applicable to the molding of ethylene polymers having a density of 0.94 and higher as, for example, such polymers prepared by chromium oxide catalyzed polymerization or organometal catalyzed polymerization. The density referred to is that determined by the method of ASTM D1505–57T.

In the drawing, FIGURE 1 is a schematic elevation, partly in cross section, of an injection molding apparatus utilizing a retractable sprue bushing.

FIGURE 2 is a schematic cross section of a mold utilizing a retractable gating means having a piston thereon.

FIGURE 3 is a dimetric view of the retractable sprue bushing of FIGURE 1.

FIGURE 4 is a dimetric view of a molded disc.

FIGURE 5 is an elevation of a warped disc illustrating the measurement itemized in Table I.

In FIGURE 1, a frame 10 supports injection mold 11 and molding material injection means 12. Injection means 12 comprises hopper 13, cylinder 14, injection piston 15, mandrel 16 and nozzle 17. Injection means 12 is supported on frame 10 on a track 18 and rides on a pair of sliding supports 19 and 20. Sliding support 19 is attached to the piston of an air cylinder 21 through piston rod 22, and air cylinder 21 is in turn attached to frame 10 by support 23.

Injection mold 11 comprises a stationary mold half 24, a movable mold half 25 and actuating mechanism 26 therefor. Stationary mold half 24 is supported on frame 10 by support 27 and comprises a cavity 28 into which fits sprue bushing 29. Mechanism 26 rests on a support 30 and includes power means (not shown) for actuating rod 31 having a plate 32 on the end thereof to which movable mold half 25 is fastened.

Sprue bushing 29 is illustrated in more detail in FIGURE 3 and comprises a cylindrical extension 32 in which is formed the sprue cavity 33 and a laterally opening gate 34 machined in the side wall of extension 32 and opening into sprue cavity 33. Sprue bushing 29 also comprises a cylindrical head 35 which mates with nozzle 17 for the injection of plasticized material therethrough.

In operation, measured amounts of particles of molding material are fed to hopper 13 by metering means (not shown) but well known in the art. Piston 15 then is driven forward from the position indicated by the dotted line to move the particles forward through cylinder 14, around mandrel 16, through nozzle 17, sprue cavity 33 and into the mold cavity. Suitable heating means, for example, electrical band heaters can be provided to assist in plasticizing the molding material as it moves through cylinder 14 and around mandrel 16.

During the above operation, air supplied to air cylinder 21 from a source not shown holds cylinder 14 and therefore sprue bushing 29 to the left in FIGURE 1, the position of sprue bushing 29 being illustrated by dotted lines. Therefore, the molding material enters injection mold 11 through gate 34 and is directed laterally into the mold cavity, filling the peripheral portions of this cavity. As the mold cavity fills, the pressure within the cavity rises until the total force developed by this pressure acting upon the area of cylindrical extension 32 exceeds the force supplied to piston rod 22 by air cylinder 21. At this time, the entire assembly comprising sprue bushing 29 and injection means 12 is moved to the right on track 18 thus withdrawing cylindrical extension 32 and gate 34 from the mold cavity permitting the central portion, represented by an annular void left by the lower end of cylindrical extension 32 to be filled to complete the molded article. Mechanism 26 then operates to move mold half 25 to the left, thus releasing the molded article.

Many details of the molding machine including, for example, the molding material feeding and metering means, power means for injection piston 15, time cycle controlling means, sprue pulling means, mechanical details of structure permitting the various parts to be assembled and disassembled, etc., have been eliminated to simplify the drawing. A suitable injection molding machine for the application of our invention is a Fellows injection molding machine No. FL-732, manufactured by the Fellows Gear Shaper Co., Springfield, Vt.

In the apparatus illustrated in FIGURE 2, a movable mold half 40 cooperates with a stationary mold half 41 to form a mold cavity 42. Sprue bushing 43 is fixed in stationary mold half 41 as shown. A cylinder 44 is located in mold half 40 and contains piston 45 which comprises a cylindrical portion 46, the lower end of which has a gating slot 47 formed therein. Fluid under pressure is provided through line 48, valve 49 and conduit 50 while the space below piston 45 within cylinder 44 is vented through conduit 51, valves 52 and 54 being closed and valves 53 and 49 being open.

In the operation of the apparatus of FIGURE 2, an injection nozzle (not shown) is moved into engagement with sprue bushing 43 and the injection of molding material under pressure begins. The material is directed laterally within mold cavity 42, through gating slot 47 and thus first fills peripheral portions of mold cavity 42 and subsequently fills the mold around cylindrical portion 46 until the pressure within cavity 42 increases until the total force generated by the injection pressure on the area of cylindrical portion 46 exceeds the force generated by the fluid pressure within cylinder 44 acting on the upper side of piston 45. Cylindrical portion 46 is machined to fit the opening at the lower end of cylinder 44 to provide a seal preventing flow of the molding material therethrough. When the upward force generated by injection pressure exceeds the downward force supplied by the fluid pressure in cylinder 44, piston 45, including cylindrical portion 46 and gating slot 47, is forced upward out of mold cavity 42, thus permitting the central cylindrical portion vacated by cylindrical portion 46 to be filled.

In another apparatus according to our invention, valves 49, 52, 53 and 54 are operated in a time cycle sequence through suitable timing apparatus (not shown) to coordinate with the injection time cycle. In this apparatus, fluid under pressure is supplied through line 48, open valve 49 and through conduit 50 to the upper portion of cylinder 44 above piston 45 to hold the gating slot 47 into position. At the desired point in the injection time cycle, valve 49 is closed, valve 54 is opened, valve 53 is closed and valve 52 is opened, thus venting the upper portion of cylinder 44 and applying pressure to the lower portion thereof to lift the gating means out of mold cavity 42 completely independent of the pressure therein.

Other features of the apparatus of FIGURE 2 include a cylindrical opening through piston 45 in which is operated an ejector pin 60, a grooved section 57 to provide sprue pulling engagement with the molded article, and O-ring seals 58 and 59. However, many details of the apparatus are not shown, again to simplify the drawing.

EXAMPLE I

In a test made to determine the effectiveness of our invention in reducing warpage in injection molded articles, circular discs were molded in a mold 8 inches in diameter and 0.070 inch thick from polyethylene polymer having a melt index of 5.0, a density of 0.960, and a softening temperature of 260° F. The molding machine was a Fellows Model FL-732 injection molding machine. The injection cylinder temperature was maintained at 450° F., the mold temperature was 42° F., and the injection pressure was 16,000 p.s.i. 40 p.s.i air pressure was maintained on piston 45 which was 1.500 inches in diameter. The cylindrical portion 46 was .650 inch in diameter. The warping of the molded discs occurred as illustrated in FIGURE 5 along two axes approximately 90° apart. The axis Y—Y warped into the form indicated by $Y_1$—$Y_1$, while the axis Y—Y warped into the position indicated by $X_1$—$X_1$. The warpage was measured as the sum of the maximum distances from a flat surface on which the disk rested of two points on opposite sides of the disc rim. As will be seen from the illustration in FIGURE 4, this measurement includes the deviation of the Y axis which lowers two sides of the disc below the plane of the mold and the deviation of the X axis which lifts the edges in question above the original plane of the mold. Since the warpage occurred in relatively regular curves along axes approximately 90° apart, measuring the maximum deviation from a flat surface of two sides of the disc results in a reasonable determination of the effective warpage.

The results of tests made with a variation in feed to the injection cylinder to vary the weight of the molded discs are shown in Table I. In the table, the discs labeled C were made by reducing the air pressure on piston 45 essentially to 0, thus permitting cylindrical portion 46 to remain withdrawn throughout the molding operation while the discs labeled A were made as stated with 40 p.s.i.g. air pressure on the piston which was enough to keep 46 projecting into the mold cavity until all the mold except the central portion occupied by cylindrical portion 46 was filled, after which the injection pressure forced this portion to withdraw from the mold cavity.

Table I

| Disc No. | Wt. of Disc (grams) | $C_a$ (mm.) | $C_b$ (mm.) | C total (mm.) | C Total (Avg.) (mm.) | $A_a$ (mm.) | $A_b$ (mm.) | A Total (mm.) | A Total (Avg.) (mm.) |
|---|---|---|---|---|---|---|---|---|---|
| 1 | 55.5 | 9 | 9 | 18 | 18 | 2 | 2 | 4 | 7 |
| 2 | 55.5 | | | | | 5 | 2 | 7 | |
| 3 | 55.5 | | | | | 4 | 4 | 8 | |
| 4 | 55.5 | | | | | 4 | 5 | 9 | |
| 5 | 55.0 | 9 | 10 | 19 | 17 | 3 | 2 | 5 | 6 |
| 6 | 55.0 | 10 | 8 | 18 | | 5 | 4 | 9 | |
| 7 | 55.0 | 7 | 7 | 14 | | 1 | 2 | 3 | |
| 8 | 54.5 | 8 | 10 | 18 | | 7 | 4 | 11 | |
| 9 | 54.5 | 10 | 9 | 19 | 16 | 5 | 5 | 10 | 9 |
| 10 | 54.5 | 4 | 5 | 9 | | 4 | 2 | 6 | |
| 11 | 54.5 | 9 | 7 | 16 | | 2 | 2 | 4 | |
| 12 | 54.0 | 10 | 10 | 20 | | 4 | 4 | 8 | |
| 13 | 54.0 | 10 | 7 | 17 | 18 | 6 | 6 | 12 | 7 |
| 14 | 54.0 | 9 | 9 | 18 | | 5 | 7 | 12 | |
| 15 | 54.0 | | | | | 0 | 0 | 0 | |
| 16 | 54.0 | | | | | | | | |

An examination of the data of this table illustrates clearly the superiority of the discs molded according to our invention.

Our invention is applicable to the use of other means for supplying the necessary operating forces as for example, hydraulic pressure, springs, etc., and to the use of different means, as for example, an extruder screw, for applying the necessary pressure to the molding material to be injected.

In those instances in which the withdrawal of the gating means is accomplished responsive to the pressure within the mold cavity, there are several ways to determine and control the value of pressure at which the withdrawal takes place. The ratio of areas over which differential pressures act, such as the areas of piston 45 and cylindrical portion 46 in FIGURE 2, can be changed by changing the parts of the molding machine. The pressure applied to a piston such as piston 45 can be varied to vary the value of mold pressure at which the gating means withdraws from the mold. Control responsive to mold pressure can also be obtained by using a pressure sensing element to sense the pressure within the mold and to cause a withdrawal force to be applied to the gating means when the pressure within the mold reaches a predetermined value. When the means for applying force to project the gating means into the mold comprises a spring, the actuating mold pressure can be varied by changing the spring itself or the loading thereon.

Reasonable modification and variations are possible within the scope of our invention in which are set forth a method and apparatus for injection molding by injecting laterally in a single direction within a mold to fill the peripheral portions thereof and subsequently filling the central portion thereof.

We claim:

1. Injection molding apparatus comprising an injection mold, molding material injection means, gating means for directing molding material laterally into said mold through an angle less than 180°, means to extend said gating means into said mold and means to withdraw said gating means to permit filling that portion of the mold occupied by said gating means.

2. Injection molding apparatus comprising an injection mold, molding material injection means, gating means for directing molding material laterally into said mold through an angle between about 5° and about 25°, means to extend said gating means into said mold and means to withdraw said gating means to permit filling that portion of the mold occupied by said gating means.

3. Injection molding apparatus comprising an injection mold, molding material injection means, gating means for directing molding material laterally into said mold through an angle less than 180°, means for projecting said gating means into said mold in flow directing position, means for withdrawing said gating means responsive to a predetermined value of injection pressure to permit filling that portion of the mold occupied by said gating means.

4. Injection molding apparatus comprising an injection mold, molding material injection means, gating means for directing molding material laterally into said mold through an angle less than 180°, means for projecting said gating means into said mold in flow directing position, means for withdrawing said gating means at a predetermined point in the injection time cycle to permit filling that portion of the mold occupied by said gating means.

5. Injection molding apparatus comprising an injection mold, molding material injection means, gating means for directing molding material laterally into said mold through an angle less than 180°, a piston operatively associated with said gating means and means to apply pressure thereto to urge said gating means into said mold in flow directing position, means to apply molding pressure within said mold to urge said gating means out of said mold, whereby said gating means is withdrawn when the injection pressure reaches a predetermined value to permit filling that portion of the mold occupied by said gating means.

6. Injection molding apparatus comprising an injection mold, molding material injection means, gating means for directing molding material laterally into said mold through an angle less than 180°, a piston operatively associated with said gating means, means to apply pressure to one side of said piston to urge said gating means into said mold in flow directing position, means to apply molding pressure to the opposite side of said piston to urge said gating means out of said mold, whereby said gating means is withdrawn to permit filling that portion of the mold occupied by said gating means.

7. An injection molding method comprising directing injected molding material laterally in a molding zone through an angle less than 180° to fill all peripheral portions of said zone and subsequently filling the central portion of said zone.

8. An injection molding method comprising directing injected molding material laterally in a molding zone through an angle between about 5° and about 25° to fill all peripheral portions of said zone and subsequently filling the central portion of said zone.

9. An injection molding method comprising applying a first pressure force to cause blocking of the central portion of a molding zone and create a gating zone therein having an injection angle less than 180°, injecting molding material through said gating zone to fill peripheral portions of said molding zone, subsequently unblocking said central portion of said molding zone through the application of a second pressure force and filling said central portion.

10. The method of claim 9 wherein said angle is between about 5° and about 25°.

11. A method for injection molding of polyethylene comprising applying a first pressure force to cause blocking of the central portion of a molding zone and create a gating zone area having an injection angle less than 180°, injecting said polyethylene through said gating zone to fill peripheral portions of said molding zone, subsequently unblocking said central portion of said molding zone through the application of a second pressure force and filling said central portion with said polyethylene.

12. The method of claim 11 wherein said angle is between about 5° and about 25°.

References Cited in the file of this patent

UNITED STATES PATENTS

| | | |
|---|---|---|
| 2,253,627 | Knowles | Aug. 26, 1941 |
| 2,777,164 | Strahm | Jan. 15, 1957 |
| 2,886,850 | Kubiliunas | May 19, 1959 |

OTHER REFERENCES

Paggi; Society of Plastics Engineers, Volume 13, No. 12, December 1957; pages 48 and 50.